United States Patent
Lee et al.

(10) Patent No.: US 10,922,783 B2
(45) Date of Patent: Feb. 16, 2021

(54) CUBE-BASED PROJECTION METHOD THAT APPLIES DIFFERENT MAPPING FUNCTIONS TO DIFFERENT SQUARE PROJECTION FACES, DIFFERENT AXES, AND/OR DIFFERENT LOCATIONS OF AXIS

(71) Applicant: MEDIATEK INC., Hsin-Chu (TW)

(72) Inventors: Ya-Hsuan Lee, Hsin-Chu (TW); Jian-Liang Lin, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/285,215

(22) Filed: Feb. 26, 2019

(65) Prior Publication Data

US 2019/0272617 A1    Sep. 5, 2019

Related U.S. Application Data

(60) Provisional application No. 62/637,425, filed on Mar. 2, 2018.

(51) Int. Cl.
  *G06T 3/00*    (2006.01)
(52) U.S. Cl.
  CPC .................................. *G06T 3/0087* (2013.01)
(58) Field of Classification Search
  CPC .................................................... G06T 3/0087
  See application file for complete search history.

(56) References Cited

U.S. PATENT DOCUMENTS

| | | |
|---|---|---|
| 2017/0270634 A1 | 9/2017 | Eggebrecht |
| 2018/0103242 A1 | 4/2018 | Budagavi |
| 2018/0167613 A1* | 6/2018 | Hannuksela ........ H04N 21/4728 |
| 2018/0276789 A1* | 9/2018 | Van Der Auwera ........................ G06T 3/0062 |
| 2018/0359459 A1* | 12/2018 | Lee ....................... H04N 13/111 |
| 2019/0014347 A1* | 1/2019 | Hendry ................. H04N 19/176 |
| 2020/0092582 A1* | 3/2020 | Xiu ......................... G06T 3/0087 |

FOREIGN PATENT DOCUMENTS

| | | |
|---|---|---|
| CN | 106686381 A | 5/2017 |
| CN | 106780317 A | 5/2017 |
| CN | 107113414 A | 8/2017 |
| TW | I527433 B | 3/2016 |
| TW | I611689 B | 1/2018 |

(Continued)

OTHER PUBLICATIONS

"International Search Report" dated May 29, 2019 for International application No. PCT/CN2019/076665, International filing date: Mar. 1, 2019.

(Continued)

*Primary Examiner* — Grace Q Li
(74) *Attorney, Agent, or Firm* — Winston Hsu

(57) ABSTRACT

A cube-based projection method includes generating pixels of different square projection faces associated with a cube-based projection of a 360-degree image content of a sphere. Pixels of a first square projection face are generated by utilizing a first mapping function set. Pixels of a second square projection face are generated by utilizing a second mapping function set. The different square projection faces include the first square projection face and the second square projection face. The second mapping function set is not identical to the first mapping function set.

19 Claims, 9 Drawing Sheets

(56) References Cited

FOREIGN PATENT DOCUMENTS

| WO | 2017/118377 A1 | 7/2017 |
| WO | 2017/190710 A1 | 11/2017 |
| WO | 2017/220012 A1 | 12/2017 |
| WO | 2018/001194 A1 | 1/2018 |
| WO | 2018/035721 A1 | 3/2018 |

OTHER PUBLICATIONS

"International Search Report" dated Jun. 4, 2019 for International application No. PCT/CN2019/076685, International filing date: Mar. 1, 2019.

* cited by examiner

CUBE-BASED PROJECTION METHOD THAT APPLIES DIFFERENT MAPPING FUNCTIONS TO DIFFERENT SQUARE PROJECTION FACES, DIFFERENT AXES, AND/OR DIFFERENT LOCATIONS OF AXIS

CROSS REFERENCE TO RELATED APPLICATIONS

This application claims the benefit of U.S. provisional application No. 62/637,425, filed on Mar. 2, 2018 and incorporated herein by reference.

BACKGROUND

The present invention relates to processing an omnidirectional video frame, and more particularly, to a cube-based projection method that applies different mapping functions to difference square projection faces, different axes, and/or different locations of an axis.

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional video corresponding to a sphere. With advances in camera rigs and HMDs, the delivery of VR content may soon become the bottleneck due to the high bitrate required for representing such a 360-degree image content. When the resolution of the omnidirectional video is 4K or higher, data compression/encoding is critical to bitrate reduction.

In general, the omnidirectional video corresponding to a sphere is transformed into a projection-based frame with a 360-degree image content represented by projection faces packed in a 360-degree Virtual Reality (360 VR) projection layout, and then the projection-based frame is encoded into a bitstream for transmission. However, if mapping/projection between the sphere and projection faces is not properly designed, it is possible that the encoding/decoding quality may be degraded due to a non-uniform sampling rate.

SUMMARY

One of the objectives of the claimed invention is to provide a cube-based projection method that applies different mapping functions to difference square projection faces, different axes, and/or different locations of an axis. For example, a more uniform sampling rate can be achieved by the proposed mapping functions.

According to a first aspect of the present invention, an exemplary cube-based projection method is disclosed. The exemplary cube-based projection method includes: generating, by a conversion circuit, pixels of different square projection faces associated with a cube-based projection of a 360-degree image content of a sphere. Pixels of a first square projection face are generated by utilizing a first mapping function set. Pixels of a second square projection face are generated by utilizing a second mapping function set. The different square projection faces include the first square projection face and the second square projection face. The second mapping function set is not identical to the first mapping function set.

According to a second aspect of the present invention, an exemplary cube-based projection method is disclosed. The exemplary cube-based projection method includes: generating, by a conversion circuit, pixels of different square projection faces associated with a cube-based projection of a 360-degree image content of a sphere. Pixels of one of the different square projection faces are generated by utilizing a mapping function set that includes different mapping functions applied to different axes, respectively.

According to a third aspect of the present invention, an exemplary cube-based projection method is disclosed. The exemplary cube-based projection method includes: generating, by a conversion circuit, pixels of different square projection faces associated with a cube-based projection of a 360-degree image content of a sphere. Pixels of one of the different square projection faces are generated by utilizing a mapping function set that includes different mapping functions applied to a same axis. The different mapping functions include a first mapping function and a second mapping function. One of the different square projection faces has a first pixel that is set according to a first location on the same axis and the first mapping function, and has a second pixel that is set according to a second location on the same axis and the second mapping function, where the second location is different from the first location.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names.

This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
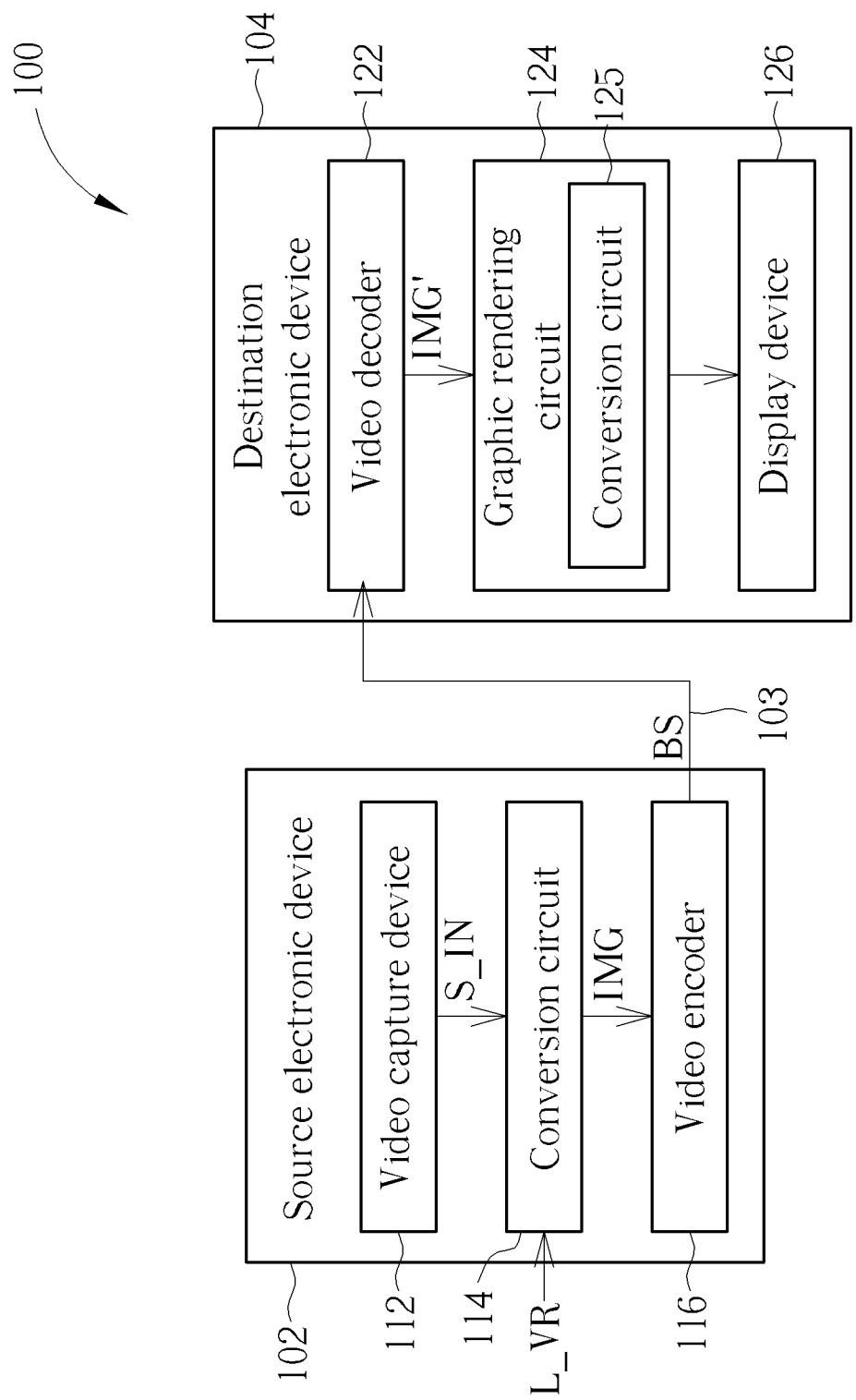
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes a source electronic device 102 and a destination device 104. The source electronic device 102 includes a video capture device 112, a conversion circuit 114, and a video encoder 116. For example, the video capture device 112 may be an omnidirectional camera. The conversion circuit 114 generates a projection-based frame IMG with a 360-degree Virtual Reality (360 VR) projection layout L_VR according to an omnidirectional video frame S_IN corresponding to a sphere, where the omnidirectional video frame S_IN contains a 360-degree image content of the sphere. The video encoder 116 is an encoding circuit that encodes the projection-based frame IMG (which has projection faces packed in the 360 VR projection layout L_VR) to generate a part of a bitstream BS, and outputs the bitstream BS to the destination electronic device 104 via a transmission means 103 such as a wired/wireless communication link or a storage medium.

The destination electronic device 104 may be a head-mounted display (HMD) device. As shown in FIG. 1, the destination electronic device 104 includes a video decoder 122, a graphic rendering circuit 124, and a display device 126. The video decoder 122 is a decoding circuit that receives the bitstream BS from the transmission means 103 (e.g., wired/wireless communication link or storage medium), and decodes a part of the received bitstream BS to generate a decoded frame IMG'. In this embodiment, the frame IMG to be encoded by the video encoder 116 has a 360 VR projection layout L_VR. Hence, after a part of the bitstream BS is decoded by the video decoder 122, the decoded frame (i.e., reconstructed frame) IMG' has the same 360 VR projection layout L_VR. In other words, the decoded frame IMG' is also a projection-based frame that has projection faces packed in the 360 VR projection layout L_VR. The graphic rendering circuit 124 is arranged to drive the display device 126 to show an image content of a viewport area selected by a user. The graphic rendering circuit 124 includes a conversion circuit 125 that is arranged to process a portion of the 360-degree image content carried by the decoded frame IMG' for obtaining pixel data associated with the image content of the viewport area.

Figure 2:
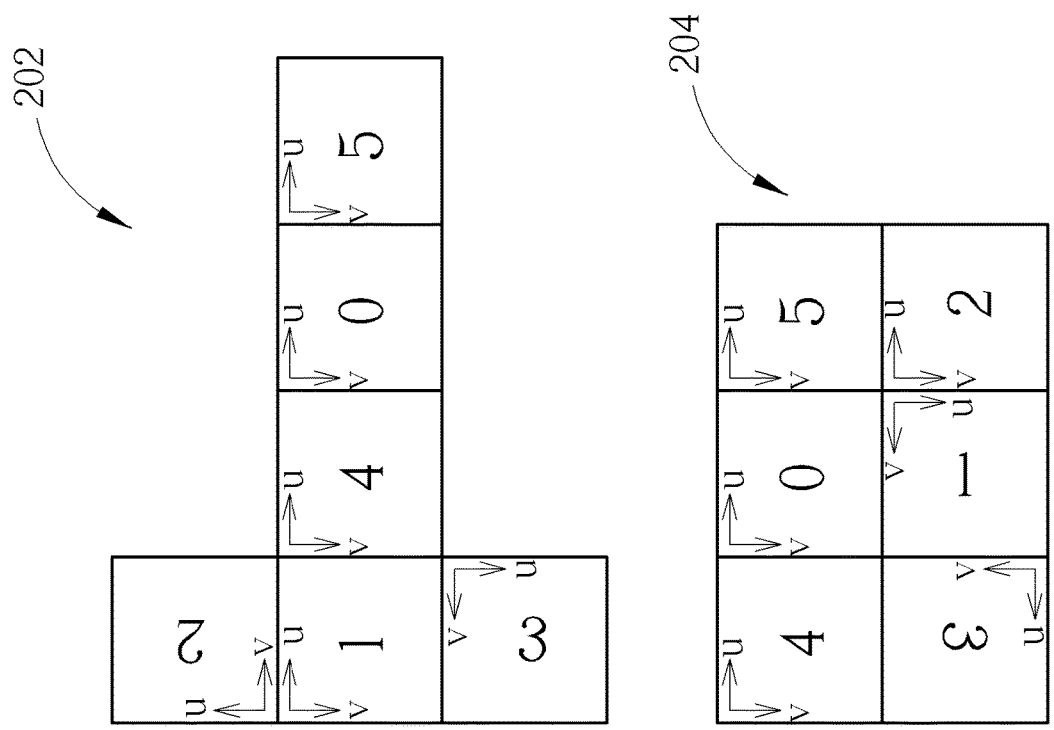
FIG. 2 is a diagram illustrating a cube-based projection according to an embodiment of the present invention.
Figure 2:
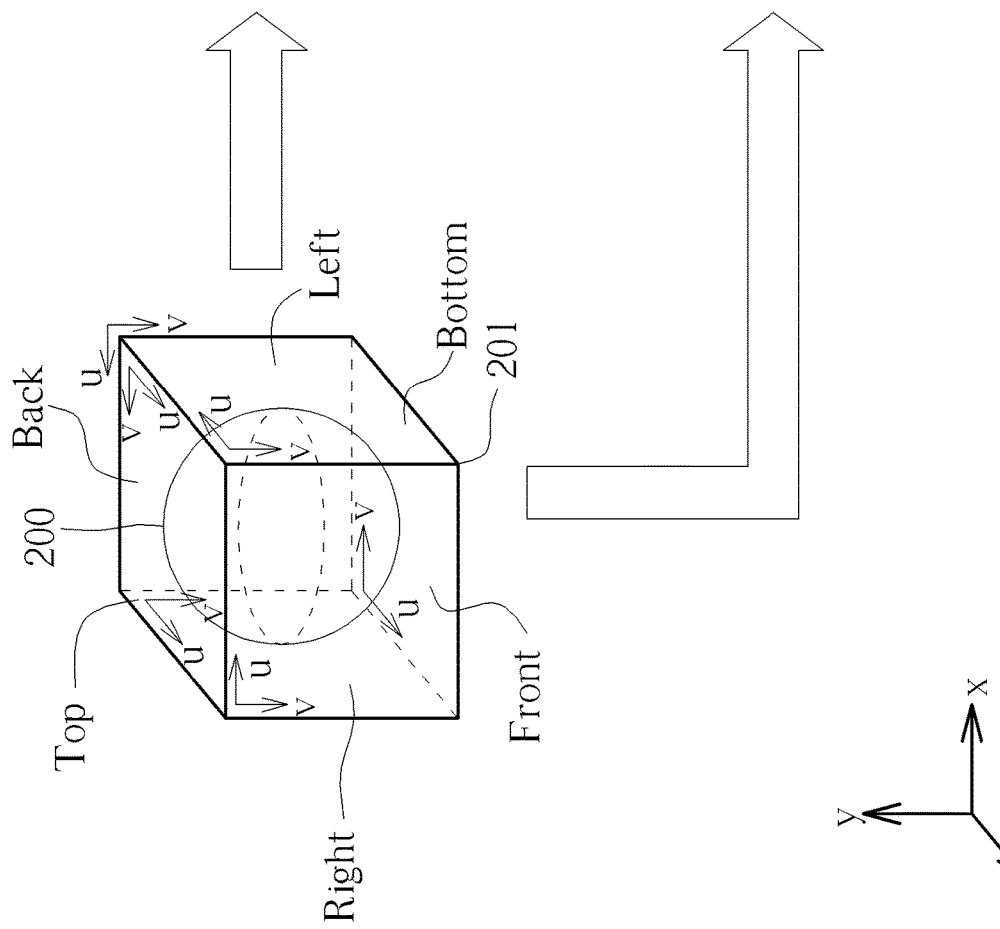

In this embodiment, the 360 VR projection layout L_VR is a cube-based projection layout. Hence, six square projection faces derived from different faces of a cube are packed in the cube-based projection layout that is employed by the projection-based frame IMG/decoded frame IMG'. Regarding the conversion circuit 114 of the source electronic device 102, a cube-based projection is employed to generate square projection faces of a cube in a three-dimensional (3D) space. FIG. 2 is a diagram illustrating a cube-based projection according to an embodiment of the present invention. The 360-degree image content on the sphere 200 is projected onto six faces of a cube 201, including a top face (labeled by "Top"), a bottom face (labeled by "Bottom"), a left face (labeled by "Left"), a front face (labeled by "Front"), a right face (labeled by "Right"), and a back face (labeled by "Back"). As shown in FIG. 2, an image content of a north polar region of the sphere 200 is projected onto the top face "Top", an image content of a south polar region of the sphere 200 is projected onto the bottom face "Bottom", and an image content of an equatorial region of the sphere 200 is projected onto the left face "Left", the front face "Front", the right face "Right", and the back face "Back".

In the 3D space that is defined by x-axis, y-axis, and z-axis, each point on six faces is located at (x, y, z), where $x,y,z \in [-1,1]$. Hence, the front face "Front" is on a z-plane with z=1, the back face "Back" is on a z-plane with z=−1, the top face "Top" is on a y-plane with y=1, the bottom face "Bottom" is on a y-plane with y=−1, the left face "Left" is on an x-plane with x=1, and the right face "Right" is on an x-plane with x=−1.

Forward transformation is used to transform from the 3D space (x, y, z) to the 2D plane (u, v). Hence, the top face "Top", bottom face "Bottom", left face "Left", front face "Front", right face "Right", and back face "Back" of the cube 201 in the 3D space are transformed into a top face (labeled by "2"), a bottom face (labeled by "3"), a left face (labeled by "5"), a front face (labeled by "0"), a right face (labeled by "4"), and a back face (labeled by "1") on the 2D plane.

Inverse transformation is used to transform from the 2D plane (u, v) to the 3D space (x, y, z). Hence, the top face (labeled by "2"), the bottom face (labeled by "3"), the left face (labeled by "5"), the front face (labeled by "0"), the right face (labeled by "4"), and the back face (labeled by "1") on the 2D plane are transformed into the top face "Top", bottom face "Bottom", left face "Left", front face "Front", right face "Right", and back face "Back" of the cube 201 in the 3D space.

Regarding the front face "Front" with z=1, the x-axis may be mapped to a u-axis, and the y-axis may be mapped to a v-axis. Regarding the back face "Back" with z=−1, the x-axis may be mapped to the u-axis, and the y-axis may be mapped to the v-axis. Regarding the top face "Top" with y=1, the z-axis may be mapped to the u-axis, and the x-axis may be mapped to the v-axis. Regarding the bottom face "Bottom" with y=−1, the z-axis may be mapped to the u-axis, and the x-axis may be mapped to the v-axis. Regarding the left face "Left" with x=1, the z-axis may be mapped to the u-axis, and the y-axis may be mapped to the v-axis. Regarding the right face "Right" with x=−1, the z-axis may be mapped to the u-axis, and the y-axis may be mapped to the v-axis. However, these are for illustrative purposes only, and are not meant to be limitations of the present invention. In practice, the mapping between axes may be adjusted, depending upon actual design considerations.

Taking forward transformation of the front face "Front" for example, the following mapping functions may be used to obtain the front face "0".

$$\begin{cases} u = \dfrac{x}{z} \\ v = \dfrac{y}{z} \end{cases}$$

Taking inverse transformation of the front face "0" for example, the following mapping functions may be used to obtain the front face "Front".

$$\begin{cases} x = u \\ y = v \\ z = 1 \end{cases}$$

Figure 3:
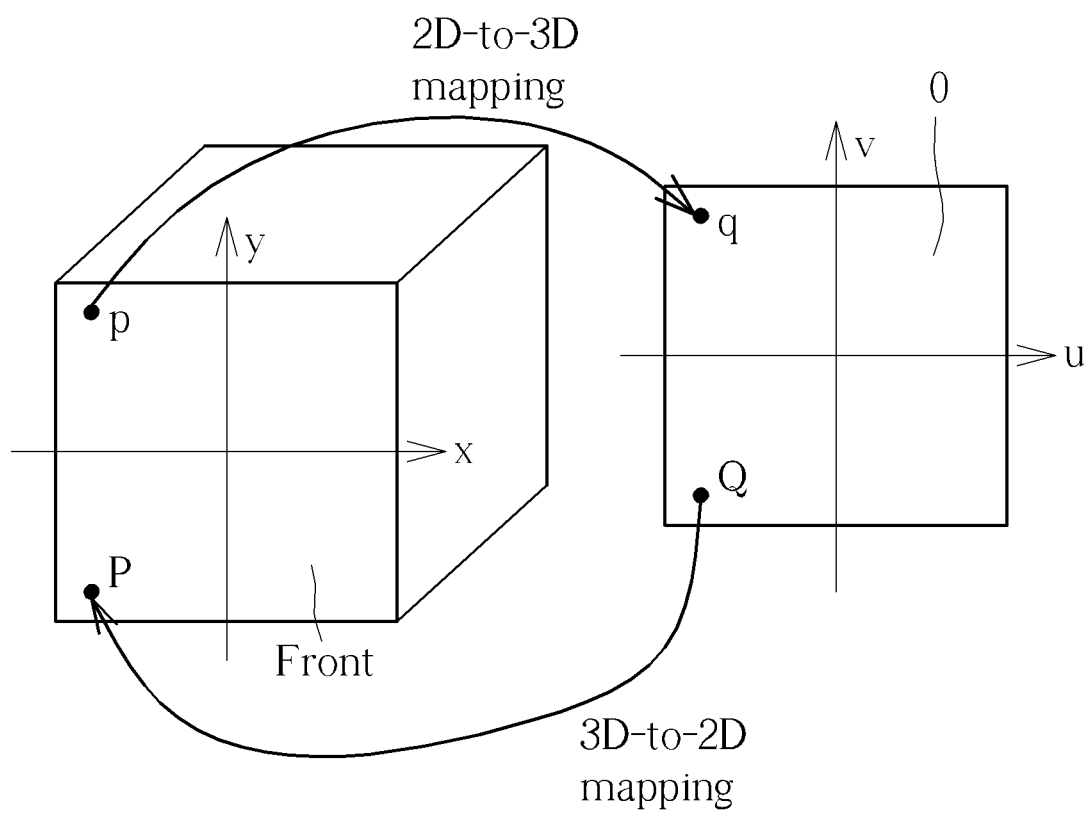
FIG. 3 is a diagram illustrating mapping between a square projection face of a cube in a 3D space and a square projection face on a 2D plane according to an embodiment of the present invention.

FIG. 3 is a diagram illustrating mapping between a square projection face of a cube in a 3D space and a square projection face on a 2D plane according to an embodiment of the present invention. For an integer pixel q with a 2D coordinate (u, v) on the front face "0", the 2D coordinate (u, v) can be mapped to a 3D coordinate (x, y, 1) of a point p on the front face "Front". Hence, the integer pixel q is set by the point p. Specifically, for any integer pixel included in the front face "0", its corresponding position in the front face "Front" can be found through 2D-to-3D mapping functions used by the inverse transformation. In this way, the front face "0" on the 2D plane can be determined by inverse transformation of the front face "Front" in the 3D space.

The inverse transformation can be employed by the conversion circuit 114 of the source electronic device 102 for generating the top face "2", bottom face "3", left face "5", front face "0", right face "4", and back face "1". The top face "2", bottom face "3", left face "5", front face "0", right face "4", and back face "1" on the 2D plane are packed to form the projection-based frame IMG to be encoded by the video encoder 116. The projection-based frame IMG to be encoded is required to be rectangular. If the cube-based projection layout 202 is directly used for creating the projection-based frame IMG, the projection-based frame IMG is unable to have a compact layout due to many dummy areas (e.g., black areas, gray areas, or white areas) filled in the projection-based frame IMG. Alternatively, the projection-based frame IMG can have projected image data arranged in the compact cube-based projection layout 204 to avoid using dummy areas (e.g., black areas, gray areas, or white areas).

The video decoder 122 receives the bitstream BS from the transmission means 103, and decodes a part of the received bitstream BS to generate the decoded frame IMG' that has the same projection layout L_VR (e.g., 202 or 204) adopted at the encoder side. Regarding the conversion circuit 125 of the destination electronic device 104, forward transformation is used to transform from the 3D space (x, y, z) to the 2D plane (u, v) for determining pixel values of pixels in any of the top face "Top", bottom face "Bottom", left face "Left", front face "Front", right face "Right", and back face "Back".

Please refer to FIG. 3 again. For an integer pixel P with a 3D coordinate (x, y, 1) in the front face "Front", the 3D coordinate (x, y, 1) can be mapped to a 2D coordinate (u, v) of a point Q on the front face "0". Hence, the integer pixel P is set by the point Q. Specifically, for any integer pixel included in the front face "Front", its corresponding position in the front face "0" can be found through 3D-to-2D mapping functions used by the forward transformation.

Suppose that the traditional cubemap projection (CMP) is used to project the 360-degree image content on the sphere 200 onto six faces "Top", "Bottom", "Right", Front", "Left", and "Back" of the cube 201. The sampling rate near the cube face center is much lower than the cube face boundary. The present invention proposes a modified cubemap projection design that can adjust the sampling distribution of the traditional CMP by applying functions on (u, v) (e.g., $f_u(u)/f_u(u, v)$ and $f_v(v)/f_v(u, v)$) to achieve a more uniform sampling rate.

In some embodiments of the present invention, the conversion circuit 114 at the encoder side is arranged to employ a modified cubemap projection design. In accordance with the modified cubemap projection design, different 2D-to-3D mapping function sets may be applied to different square projection faces. The conversion circuit 114 generates pixels of different square projection faces (e.g., faces "0"-"5" shown in FIG. 2) associated with a cube-based projection of a 360-degree image content of a sphere (e.g., sphere 200 shown in FIG. 2), wherein pixels of a first square projection face (e.g., one of the faces "2" and "3" shown in FIG. 2) are generated by utilizing a first 2D-to-3D mapping function set, and pixels of a second square projection face (e.g., one of the faces "0", "1", "4", and "5" shown in FIG. 2) are generated by utilizing a second 2D-to-3D mapping function set that is not identical to the first 2D-to-3D mapping function set. More specifically, the conversion circuit 114 sets the pixels of the first square projection face on the 2D plane according to pixels of one square projection face of a cube (e.g., one of the faces "Top" and "Bottom" of the cube 201 shown in FIG. 2) in the 3D space and the first 2D-to-3D mapping function set, and sets the pixels of the second square projection face on the 2D plane according to pixels of another square projection face of the cube (e.g., one of the faces "Front", "Back", "Right", and "Left" of the cube 201 shown in FIG. 2) in the 3D space and the second 2D-to-3D mapping function set.

Figure 4:
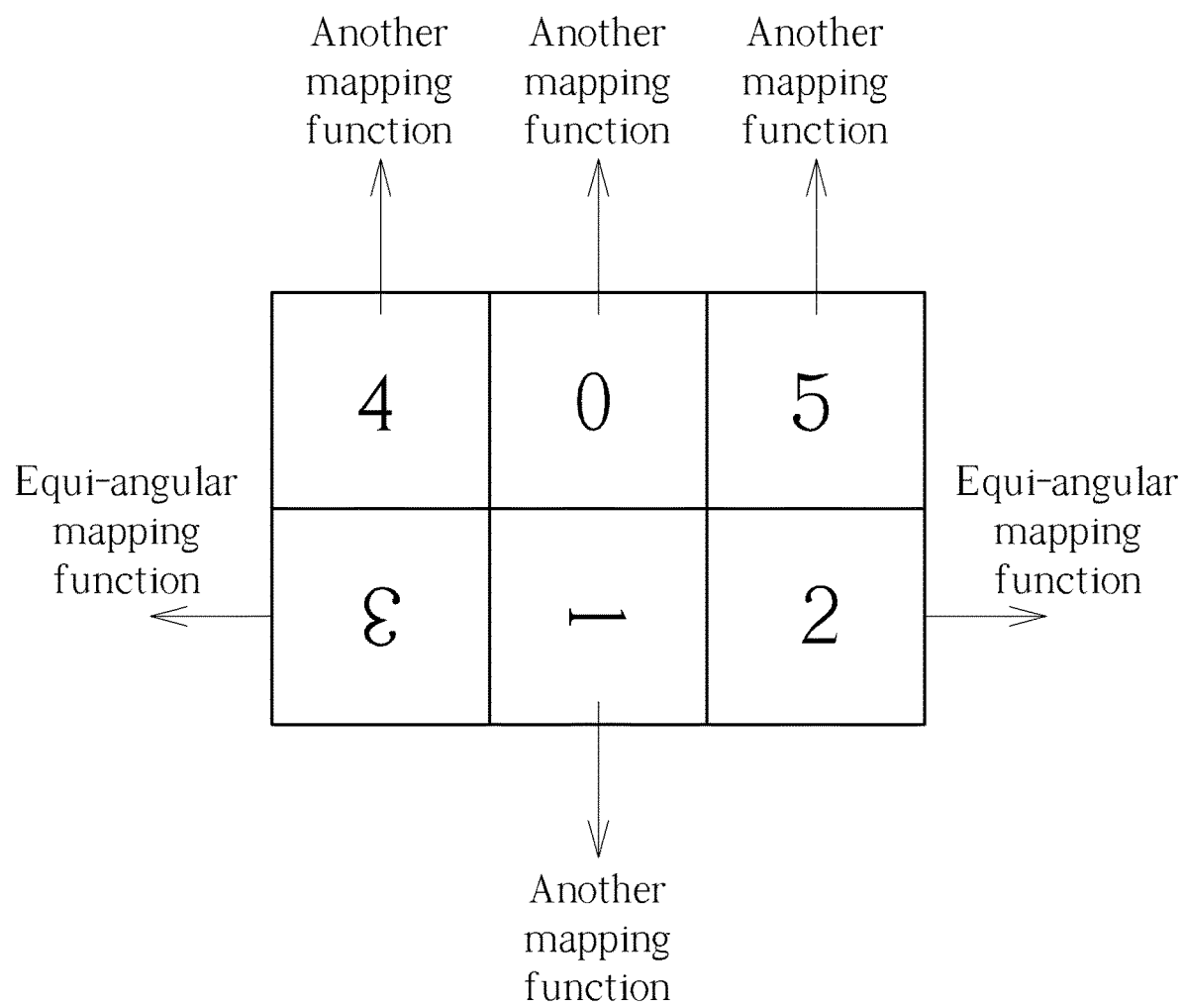
FIG. 4 is a diagram illustrating an example of using different mapping functions for setting square projection faces on a 2D plane according to square projection faces of a cube in a 3D space.

For example, a proposed hybrid equi-angular cubemap projection (HEC) can be employed by the conversion circuit 114, where the first 2D-to-3D mapping function set includes one 2D-to-3D mapping function that is an equal-angular mapping function, and the second 2D-to-3D mapping function set includes one 2D-to-3D mapping function that is not an equal-angular mapping function. In one exemplary design, the first square projection face generated through the first 2D-to-3D mapping function set (which includes one 2D-to-3D mapping function that is an equal-angular mapping function) may be one of the top face "2" and the bottom face "3" shown in FIG. 2, and the second square projection face generated through the second 2D-to-3D mapping function set (which includes one 2D-to-3D mapping function that is not an equal-angular mapping function) may be one of the left face "5", the front face "0", the right face "4", and the back face "1". FIG. 4 is a diagram illustrating an example of using different mapping functions for setting square projection faces on a 2D plane according to square projection faces of a cube in a 3D space.

In accordance with the modified cubemap projection design, a 2D-to-3D mapping function set applied to one square projection face may include different mapping functions applied to different axes, respectively. For example, a 2D-to-3D mapping function set applied to one square projection face includes a first mapping function that is an equal-angular mapping function and is applied to a first axis, and further includes a second mapping function that is not an equal-angular mapping function and is applied to a second axis which is different from the first axis.

In some embodiments of the present invention, the conversion circuit 125 at the decoder side is arranged to employ a modified cubemap projection design. In accordance with the modified cubemap projection design, different 3D-to-2D mapping function sets may be applied to different square projection faces. The conversion circuit 125 generates pixels of different square projection faces (e.g., faces "Front", "Back", "Top", "Bottom", "Right", and "Left" of the cube 201 shown in FIG. 2) associated with a cube-based projection of a 360-degree image content of a sphere (e.g., sphere 200 shown in FIG. 2), wherein pixels of a first square projection face (e.g., one of the faces "Top" and "Bottom" shown in FIG. 2) are generated by utilizing a first 3D-to-2D mapping function set, and pixels of a second square projection face (e.g., one of the faces "Front", "Back", "Right", and "Left" shown in FIG. 2) are generated by utilizing a second 3D-to-2D mapping function set that is not identical to the first 3D-to-2D mapping function set. More specifically, the conversion circuit 125 sets the pixels of the first square projection face of the cube in the 3D space according to pixels of one square projection face (e.g., one of the faces "2" and "3" shown in FIG. 2) on the 2D plane and the first 3D-to-2D mapping function set, and sets the pixels of the second square projection face of the cube in the 3D space according to pixels of another square projection face (e.g., one of the faces "0", "1", "4", and "5" shown in FIG. 2) on the 2D plane and the second 3D-to-2D mapping function set.

Figure 5:
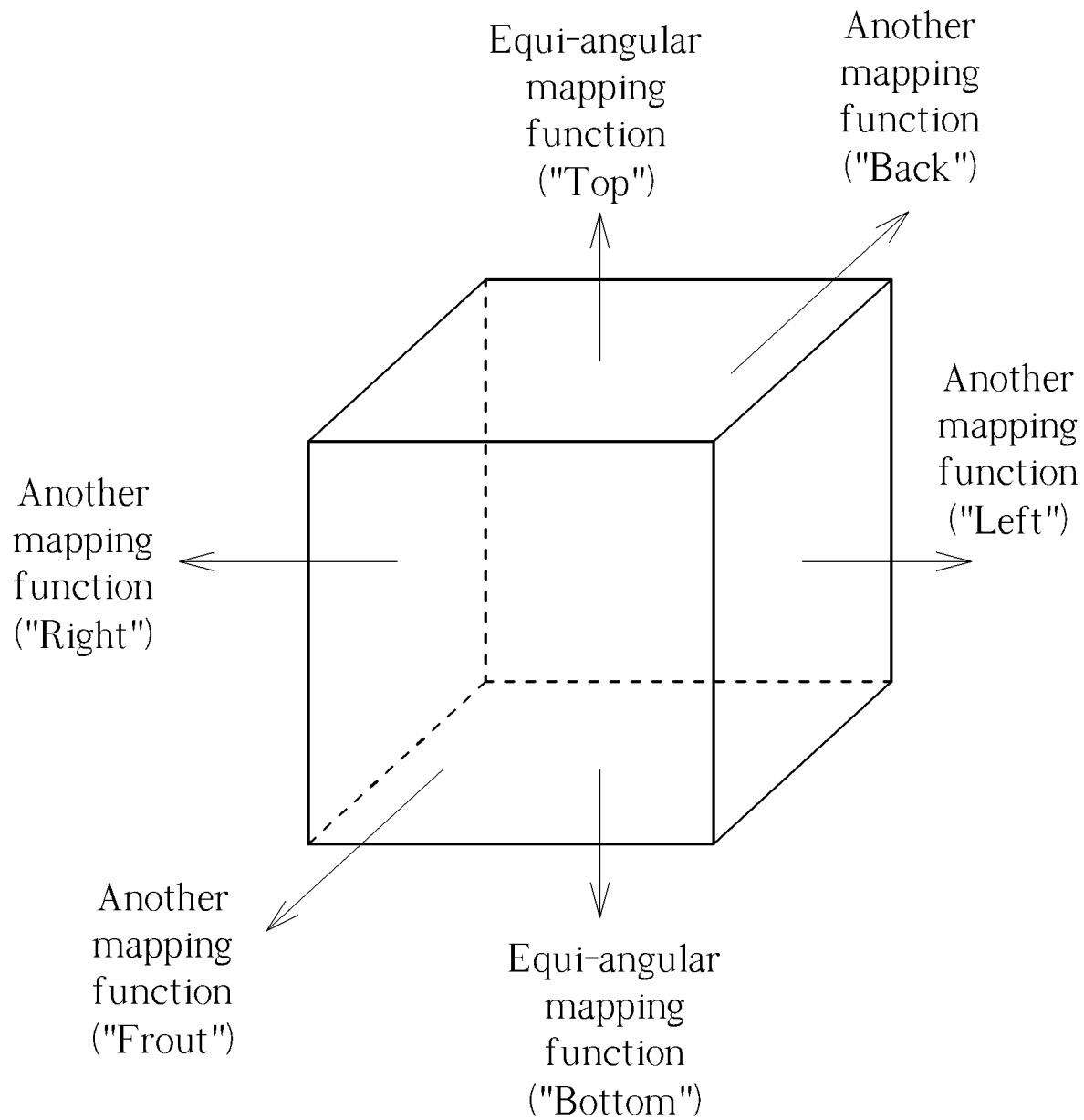
FIG. 5 is a diagram illustrating an example of using different mapping functions for setting pixels of square projection faces of a cube in a 3D space according to pixels of square projection faces on a 2D plane.

For example, a proposed hybrid equi-angular cubemap projection can be employed by the conversion circuit 125, where the first 3D-to-2D mapping function set includes one 3D-to-2D mapping function that is an equal-angular mapping function, and the second 3D-to-2D mapping function set includes one 3D-to-2D mapping function that is not an equal-angular mapping function. In one exemplary design, the first square projection face generated through the first 3D-to-2D mapping function set (which includes one 3D-to-2D mapping function that is an equal-angular mapping function) may be one of the top face "Top" and the bottom face "Bottom" shown in FIG. 2, and the second square projection face generated through the second 3D-to-2D mapping function set (which includes one 3D-to-2D mapping function that is not an equal-angular mapping function) may be one of the left face "Left", the front face "Front", the right face "Right", and the back face "Back" shown in FIG. 2. FIG. 5 is a diagram illustrating an example of using different mapping functions for setting pixels of square projection faces of a cube in a 3D space according to pixels of square projection faces on a 2D plane.

In accordance with the modified cubemap projection design, a 3D-to-2D mapping function set applied to one square projection face may include different mapping functions applied to different axes, respectively. For example, a 3D-to-2D mapping function set applied to one square projection face includes a first mapping function that is an equal-angular mapping function and is applied to a first axis, and further includes a second mapping function that is not an equal-angular mapping function and is applied to a second axis which is different from the first axis.

In a case where the proposed hybrid equi-angular cubemap projection is employed by the conversion circuit 114, one 2D-to-3D mapping function set used for setting pixels of the top face and the bottom face on the 2D plane (e.g., faces "2" and "3" shown in FIG. 2) according to pixels of the top face and the bottom face in the 3D space (e.g., faces "Top" and "Bottom" shown in FIG. 2) may be expressed by following formulas.

$$\begin{cases} f_u(u) = \tan(\frac{\pi}{4}u) \\ f_v(v) = \tan(\frac{\pi}{4}v) \end{cases}$$

Another 2D-to-3D mapping function set used by the conversion circuit 114 for setting pixels of the right face, the front face, the left face, and the back face on the 2D plane (e.g., faces "4", "0", "5", and "1" shown in FIG. 2) according to pixels of the right face, the front face, the left face, and the back face in the 3D space (e.g., faces "Right", "Front", "Left", and "Back" shown in FIG. 2) may be expressed by following formulas.

$$\begin{cases} f_u(u) = \tan(\frac{\pi}{4}u) \\ f_v(u, v) = \dfrac{v}{1 + 0.4*(1-u^2)(1-v^2)} \end{cases}$$

It should be noted that the mapping function $$f_v(u, v) = \dfrac{v}{1 + 0.4*(1-u^2)(1-v^2)}$$

is not an equi-angular mapping function, and may be replaced with $$f_v(u, v) = \dfrac{v}{1 + k*(1-u^a)^b(1-v^c)^d}$$

in other embodiments of the present invention, where k, a, b, c, d are adjustable parameters.

When the aforementioned 2D-to-3D mapping function set is applied to the front face "0" for inverse transformation, the input (u, v) represents the coordinate (u, v) of the front face "0", and the output ($f_u$(u), $f_v$(u, v)) represents the coordinate (x, y) of the front face "Front" on the z-plane with z=1.

When the aforementioned 2D-to-3D mapping function set is applied to the back face "1" for inverse transformation, the input (u, v) represents the coordinate (u, v) of the back face "1", and the output ($f_u$(u), $f_v$(u, v)) represents the coordinate (x, y) of the front face "Back" on the z-plane with z=−1.

When the aforementioned 2D-to-3D mapping function set is applied to the top face "2" for inverse transformation, the input (u, v) represents the coordinate (u, v) of the top face "2", and the output ($f_u$(u), $f_v$(v)) represents the coordinate (z, x) of the top face "Top" on the y-plane with y=1.

When the aforementioned 2D-to-3D mapping function set is applied to the bottom face "3" for inverse transformation, the input (u, v) represents the coordinate (u, v) of the bottom face "3", and the output ($f_u$(u), $f_v$(v)) represents the coordinate (z, x) of the bottom face "Bottom" on the y-plane with y=−1.

When the aforementioned 2D-to-3D mapping function set is applied to the left face "5" for inverse transformation, the input (u, v) represents the coordinate (u, v) of the left face "5", and the output ($f_u$(u), $f_v$(u, v)) represents the coordinate (z, y) of the left face "Left" on the x-plane with x=1.

When the aforementioned 2D-to-3D mapping function set is applied to the right face "4" for inverse transformation, the input (u, v) represents the coordinate (u, v) of the right face "4", and the output ($f_u$(u), $f_v$(u, v)) represents the coordinate (z, y) of the right face "Right" on the x-plane with x=−1.

Figure 6:
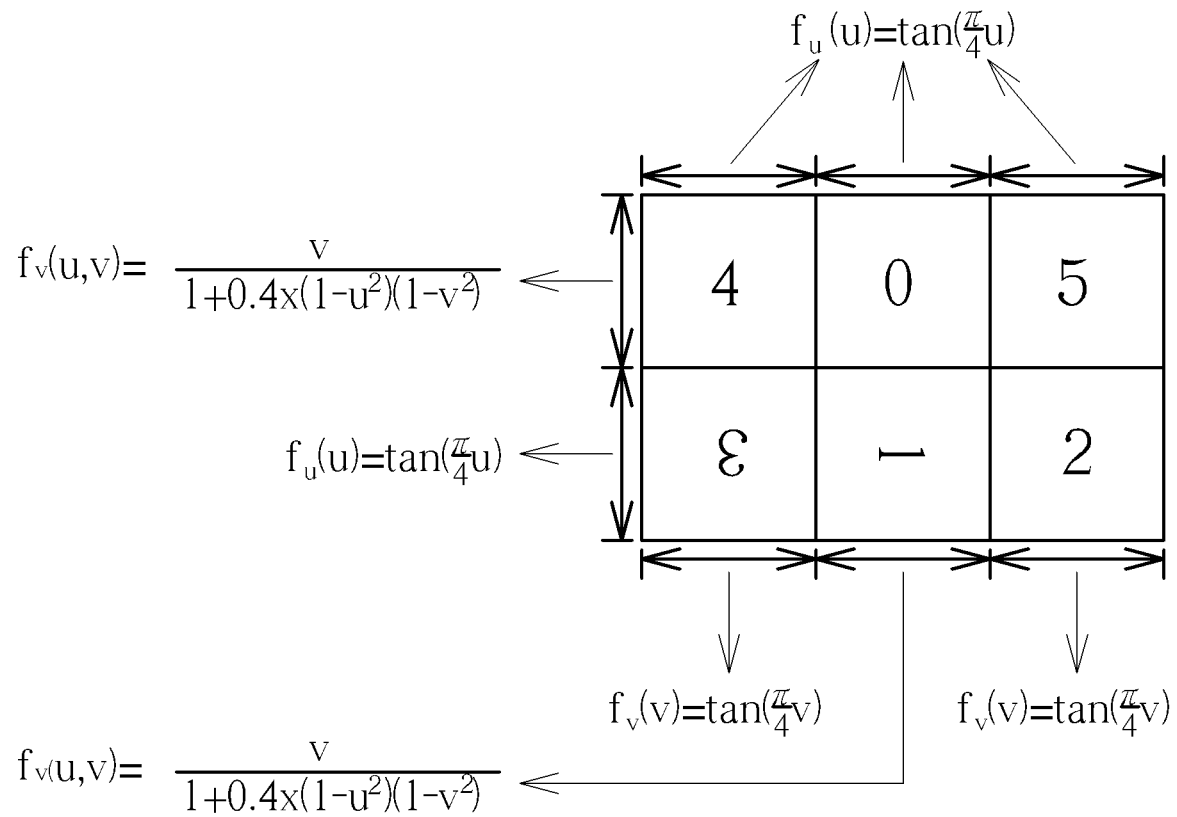
FIG. 6 is a diagram illustrating a hybrid equi-angular cubemap projection used by inverse transformation from a 2D plane to a 3D space according to an embodiment of the present invention.

Please refer to FIG. 2 in conjunction with FIG. 6. FIG. 6 is a diagram illustrating a hybrid equi-angular cubemap projection used by inverse transformation from a 2D plane to a 3D space according to an embodiment of the present invention. In accordance with the hybrid equi-angular cubemap projection, different 2D-to-3D mapping functions are applied to different faces, and different mapping functions 2D-to-3D are applied to different axes. Regarding inverse transformation of each of the top face "2" and the bottom face "3", 2D-to-3D mapping functions applied to different axes are equi-angular mapping functions. Regarding inverse transformation of each of the right face "4", front face "0", left face "5", and back face "1", one 2D-to-3D mapping function applied to one axis is an equi-angular mapping function, while another 2D-to-3D mapping function applied to another axis is not an equi-angular mapping function.

Let's take inverse transformation for generating the front face "0" from the front face "Front" shown in FIG. 3 for example. In accordance with the hybrid equi-angular cubemap projection, an integer pixel q with a 2D coordinate (u, v) on the front face "0" is mapped to a point p with a 3D coordinate ($f_u(u), f_v(u, v), 1$) on the front face "Front", where $$f_u(u) = \tan\left(\frac{\pi}{4}u\right) \text{ and } f_v(u, v) = \frac{v}{1 + 0.4*(1 - u^2)(1 - v^2)}.$$

In accordance with the modified cubemap projection design, a proposed hybrid equi-angular cubemap projection can be employed by the conversion circuit 125. One 3D-to-2D mapping function set used by the conversion circuit 125 for setting pixels of the top face and the bottom face in the 3D space (e.g., faces "Top" and "Bottom" shown in FIG. 2) according pixels of the top face and the bottom face on the 2D plane (e.g., faces "2" and "3" shown in FIG. 2) may be expressed by following formulas.

$$\begin{cases} g_u(u) = \frac{4}{\pi}\tan^{-1}(u) \\ g_v(v) = \frac{4}{\pi}\tan^{-1}(v) \end{cases}$$

Another 3D-to-2D mapping function set used by the conversion circuit 125 for setting pixels of the right face, the front face, the left face, and the back face in the 3D space (e.g., faces "Right", "Front", "Left", and "Back" shown in FIG. 2) according to pixels of the right face, the front face, the left face, and the back face on the 2D plane (e.g., faces "4", "0", "5", and 1" shown in FIG. 2) may be expressed by following formulas.

$$\begin{cases} g_u(u) = \frac{4}{\pi}\tan^{-1}(u) \\ g_v(u, v) = \begin{cases} v, \text{ if } t = 0 \\ \frac{1 - \sqrt{1 - 4t(v - t)}}{2t}, \text{ otherwise} \\ \text{where } t = 0.4v(g_u(u)^2 - 1) \end{cases} \end{cases}$$

When the aforementioned 3D-to-2D mapping function set is applied to the front face "Front" for forward transformation, the input (u, v) represents the coordinate (x, y) of the front face "Front" on the z-plane with z=1, and the output ($g_u(u), g_v(u, v)$) represents the coordinate (u, v) of the front face "0".

When the aforementioned 3D-to-2D mapping function set is applied to the back face "Back" for forward transformation, the input (u, v) represents the coordinate (x, y) of the back face "Back" on the z-plane with z=−1, and the output ($g_u(u), g_v(u, v)$) represents the coordinate (u, v) of the back face "1".

When the aforementioned 3D-to-2D mapping function set is applied to the top face "Top" for forward transformation, the input (u, v) represents the coordinate (z, x) of the top face "Top" on the y-plane with y=1, and the output ($g_u(u), g_v(v)$) represents the coordinate (u, v) of the top face "2".

When the aforementioned 3D-to-2D mapping function set is applied to the bottom face "Bottom" for forward transformation, the input (u, v) represents the coordinate (z, x) of the bottom face "Bottom" on the y-plane with y=−1, and the output ($g_u(u), g_v(v)$) represents the coordinate (u, v) of the bottom face "3".

When the aforementioned 3D-to-2D mapping function set is applied to the left face "Left" for forward transformation, the input (u, v) represents the coordinate (z, y) of the left face "Left" on the x-plane with x=1, and the output ($g_u(u), g_v(u, v)$) represents the coordinate (u, v) of the left face "5".

When the aforementioned 3D-to-2D mapping function set is applied to the right face "Right" for forward transformation, the input (u, v) represents the coordinate (z, y) of the right face "Right" on the x-plane with x=−1, and the output ($g_u(u), g_v(u, v)$) represents the coordinate (u, v) of the right face "4".

Figure 7:
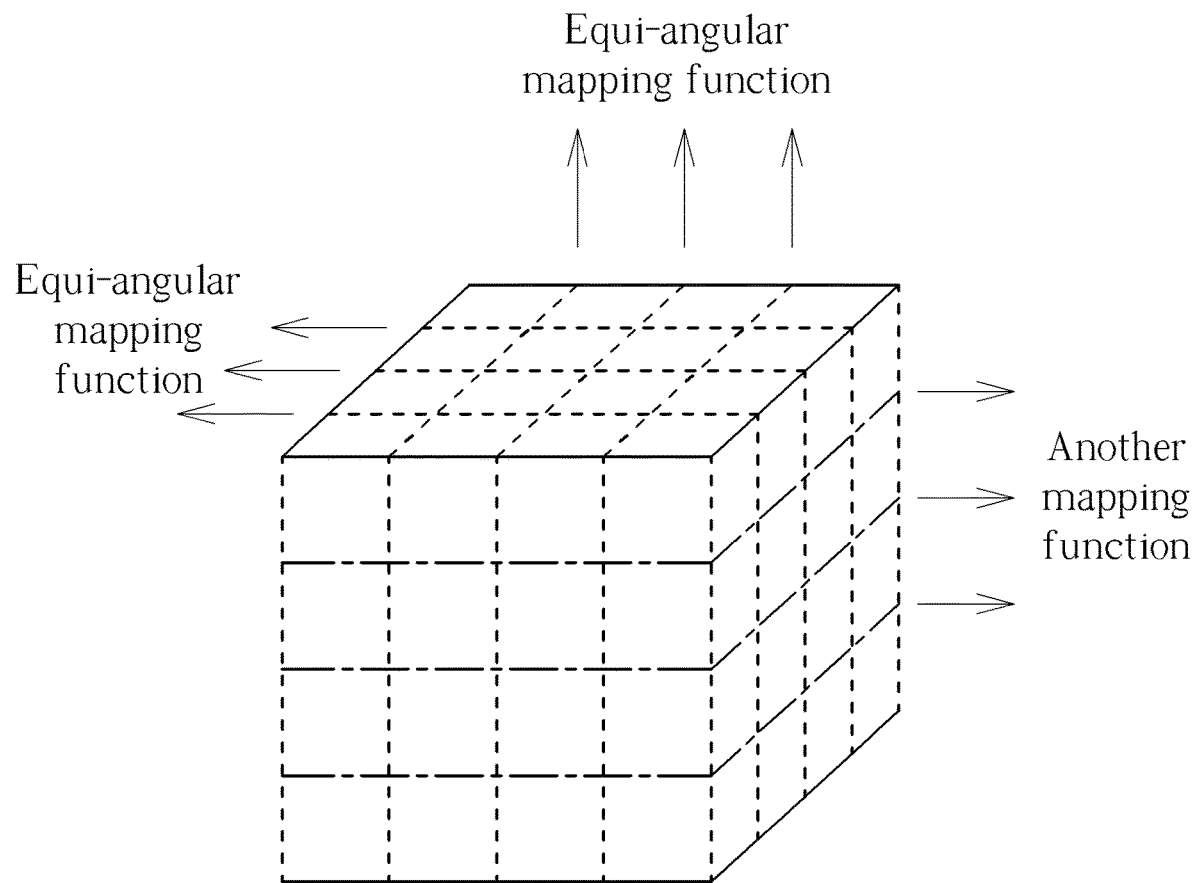
FIG. 7 is a diagram illustrating a hybrid equi-angular cubemap projection used by forward transformation from a 3D space to a 2D plane according to an embodiment of the present invention.

Please refer to FIG. 2 in conjunction with FIG. 7. FIG. 7 is a diagram illustrating a hybrid equi-angular cubemap projection used by forward transformation from a 3D space to a 2D plane according to an embodiment of the present invention. In accordance with the hybrid equi-angular cubemap projection, different 3D-to-2D mapping functions are applied to different faces, and different mapping functions 3D-to-2D are applied to different axes. Regarding forward transformation of each of the top face "Top" and the bottom face "Bottom", 3D-to-2D mapping functions applied to different axes are equi-angular mapping functions. Regarding forward transformation of each of the right face "Right", front face "Front", left face "Left", and back face "Back", one 3D-to-2D mapping function applied to one axis is an equi-angular mapping function, while another 3D-to-2D mapping function applied to another axis is not an equi-angular mapping function. Regarding the top face "Top" and the bottom face "Bottom", the equi-angular mapping function is applied to both axes to keep the continuity with other faces.

Let's take forward transformation for generating the front face "Front" from the front face "0" shown in FIG. 3 for example. In accordance with the hybrid equi-angular cubemap projection, an integer pixel P with a 3D coordinate (u, v, 1) on the front face "Front" is mapped to a point Q with a 2D coordinate ($g_u(u), g_v(u, v)$) on the front face "0", where $$g_u(u) = \frac{4}{\pi}\tan^{-1}(u) \text{ and } g_v(u, v) = \begin{cases} v, \text{ if } t = 0 \\ \frac{1 - \sqrt{1 - 4t(v - t)}}{2t}, \text{ otherwise} \\ \text{where } t = 0.4v(g_u(u)^2 - 1) \end{cases}$$

In some embodiments of the present invention, a mapping function applied to an axis can be changed at any location. For example, a 3D-to-2D mapping function set applied to one square projection face in the 3D space can have different 3D-to-2D mapping functions applied to the same axis, and a 2D-to-3D mapping function set applied to one square projection face in the 2D plane can have different 2D-to-3D mapping functions applied to the same axis. For example, different 3D-to-2D mapping functions applied to the same axis may include a first 3D-to-2D mapping function that is an equi-angular mapping function, and a second 3D-to-2D mapping function that is not an equi-angular mapping function. Hence, a square projection face on a 2D plane has a first pixel that is set according to a first location on a specific axis of a 3D space and the first 3D-to-2D mapping function, and has a second pixel that is set according to a second location on the same specific axis of the 3D space and the second 3D-to-2D mapping function, where the second location is different from the first location.

Similarly, different 2D-to-3D mapping functions applied to the same axis may include a first 2D-to-3D mapping function that is an equi-angular mapping function, and a second 2D-to-3D mapping function that is not an equi-angular mapping function. Hence, a square projection face in a 3D space has a first pixel that is set according to a first location on a specific axis of a 2D plane and the first 2D-to-3D mapping function, and has a second pixel that is set according to a second location on the same specific axis of the 2D plane and the second 2D-to-3D mapping function, where the second location is different from the first location.

Figure 8:
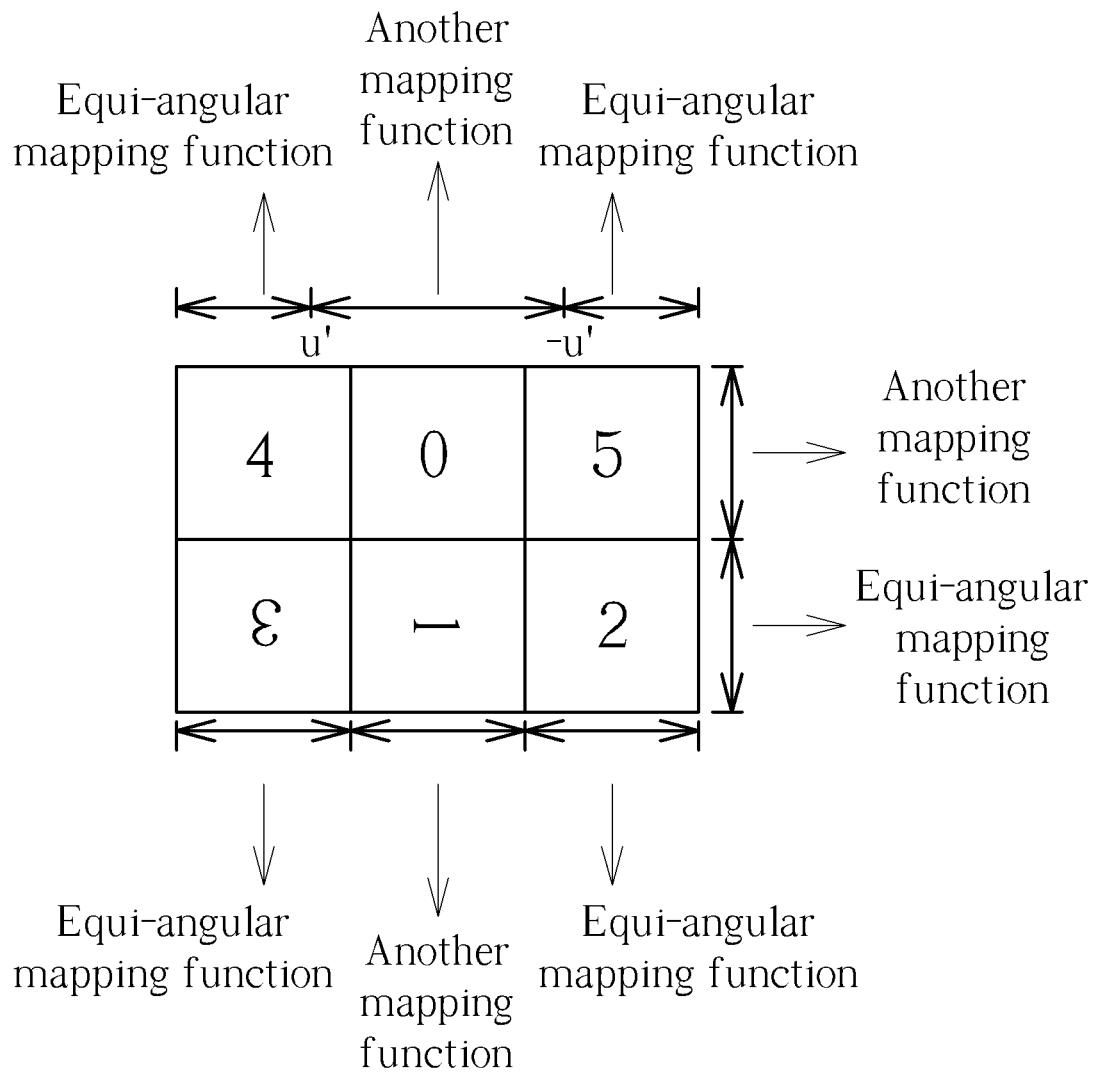
FIG. 8 is a diagram illustrating different mapping functions applied to the same axis according to an embodiment of the present invention.

FIG. 8 is a diagram illustrating different mapping functions applied to the same axis according to an embodiment of the present invention. Let's take inverse transformation from a 2D plane to a 3D space for example. Regarding inverse transformation of any of the top face "2" and the bottom face "3", 2D-to-3D mapping functions applied to different axes are equi-angular mapping functions. Regarding inverse transformation of the front face "0", 2D-to-3D mapping functions that are not equi-angular mapping functions are applied to different axes. Regarding inverse transformation of the back face one 2D-to-3D mapping function applied to one axis is an equi-angular mapping function, and another 2D-to-3D mapping function applied to another axis is not an equi-angular mapping function. Regarding inverse transformation of the right face "4", a 2D-to-3D mapping function that is not an equi-angular mapping function is applied to the v-axis, one 2D-to-3D mapping function that is an equi-angular mapping function is applied to locations u of the u-axis under the condition u≤u', and another 2D-to-3D mapping function that is not an equi-angular mapping function is applied to locations u of the u-axis under the condition u>u', where u' is a predefined number, and u∈[−1,1]. Regarding inverse transformation of the left face "5", a 2D-to-3D mapping function that is not an equi-angular mapping function is applied to the v-axis, one 2D-to-3D mapping function that is an equi-angular mapping function is applied to locations u of the u-axis under the condition u≥−u', and another 2D-to-3D mapping function that is not an equi-angular mapping function is applied to locations u of the u-axis under the condition u<−u', where −u' is a predefined number, and u∈[−1,1].

Figure 9:
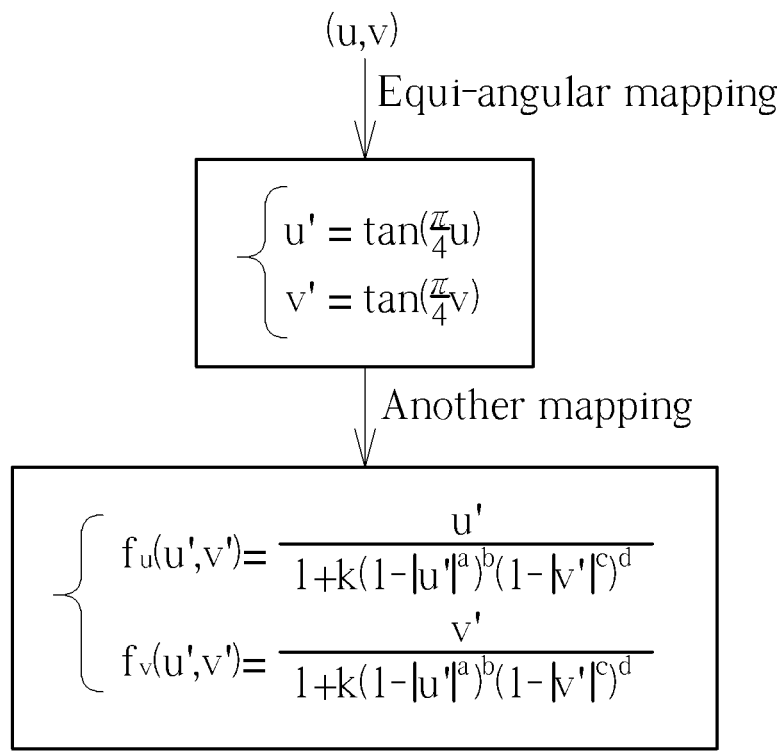
FIG. 9 is a diagram illustrating a combination of mapping function sets according to an embodiment of the present invention.

In some embodiments of the present invention, a 3D-to-2D mapping function set applied to one square projection face in a 3D space may be a combination of mapping function sets, including one mapping function set arranged to be applied to a processing result of another mapping function set, and a 2D-to-3D mapping function set applied to one square projection face on a 2D space may be a combination of mapping function sets, including one mapping function set arranged to be applied to a processing result of another mapping function set. For example, a mapping function set (e.g., 3D-to-2D mapping function or 2D-to-3D mapping function set) is a combination of a first mapping function set and a second mapping function set, where the first mapping function set include at least one equi-angular mapping function, the second mapping function set include at least one mapping function that is not an equi-angular mapping function, and the second mapping function set is applied to a processing result of the first mapping function set. FIG. 9 is a diagram illustrating a combination of mapping function sets according to an embodiment of the present invention. In this embodiment, equi-angular mapping is first used for transformation, and then another mapping function is applied to the result of equi-angular mapping.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cube-based projection method comprising:
generating, by a conversion circuit, pixels of different square projection faces associated with a cube-based projection of a 360-degree image content of a sphere, comprising:
generating pixels of a first square projection face by utilizing a first mapping function set; and
generating pixels of a second square projection face by utilizing a second mapping function set, wherein the different square projection faces comprise the first square projection face and the second square projection face;
wherein the second mapping function set comprises:

$$f_v(u, v) = \frac{v}{f_v'(u, v)},$$

where $f_v'(u, v)$ is a function of u in a first direction and v in a second direction.

2. The cube-based projection method of claim 1, further comprising:
generating a plurality of square projection faces of a cube in a three-dimensional (3D) space by applying the cube-based projection to the 360-degree image content of the sphere;
wherein generating the pixels of the first square projection face comprises:
setting the pixels of the first square projection face on a two-dimensional (2D) plane according to pixels of one square projection face of the cube in the 3D space and the first mapping function set; and
wherein generating the pixels of the second square projection face comprises:
setting the pixels of the second square projection face on the 2D plane according to pixels of another square projection face of the cube in the 3D space and the second mapping function set.

3. The cube-based projection method of claim 2, wherein the first mapping function set comprises one mapping function that is an equal-angular mapping function, and the second mapping function set comprises one mapping function that is not an equal-angular mapping function.

4. The cube-based projection method of claim 3, wherein the square projection faces of the cube in the 3D space comprise a top face, a bottom face, a left face, a front face, a right face, and a back face, where an image content of a north polar region of the sphere is projected onto the top face, an image content of a south polar region of the sphere is projected onto the bottom face, and an image content of an equatorial region of the sphere is projected onto the left face, the front face, the right face and the back face; and said one square projection face of the cube in the 3D space is one of the top face and the bottom face.

5. The cube-based projection method of claim 3, wherein the square projection faces of the cube in the 3D space comprise a top face, a bottom face, a left face, a front face, a right face, and a back face, where an image content of a north polar region of the sphere is projected onto the top face, an image content of a south polar region of the sphere is projected onto the bottom face, and an image content of an equatorial region of the sphere is projected onto the left face, the front face, the right face and the back face; and said another square projection face of the cube in the 3D space is one of the left face, the front face, the right face and the back face.

6. The cube-based projection method of claim 3, wherein $f'_v(u,v)=1+0.4*(1-u^2)(1-v^2)$;

the first mapping function set comprises:

$$f_u(u) = \tan\left(\frac{\pi}{4}u\right) \text{ and } f_v(v) = \tan\left(\frac{\pi}{4}v\right);$$

and
the second mapping function set further comprises:

$$f_u(u) = \tan\left(\frac{\pi}{4}u\right).$$

7. The cube-based projection method of claim 1, further comprising:
decoding a part of a bitstream to obtain a projection-based frame that has a plurality of square projection faces packed in a cubemap projection layout on a two-dimensional (2D) plane;
wherein the 360-degree image content of the sphere is projected onto the different square projection faces of a cube in a three-dimensional (3D) space via the cube-based projection of the sphere;
wherein generating the pixels of the first square projection face comprises:
setting the pixels of the first square projection face of the cube in the 3D space according to pixels of one square projection face packed in the projection-based frame on the 2D plane and the first mapping function set; and
wherein generating the pixels of the second square projection face comprises:
setting the pixels of the second square projection face of the cube in the 3D space according to pixels of another square projection face packed in the projection-based frame on the 2D plane and the second mapping function set.

8. The cube-based projection method of claim 7, wherein the first mapping function set comprises an equal-angular mapping function, and the second mapping function set comprises a mapping function that is not an equal-angular mapping function.

9. The cube-based projection method of claim 8, wherein the different square projection faces of the cube in the 3D space comprise a top face, a bottom face, a left face, a front face, a right face, and a back face, where an image content of a north polar region of the sphere is projected onto the top face, an image content of a south polar region of the sphere is projected onto the bottom face, and an image content of an equatorial region of the sphere is projected onto the left face, the front face, the right face and the back face; and the first square projection face is one of the top face and the bottom face.

10. The cube-based projection method of claim 8, wherein the different square projection faces of the cube in the 3D space comprise a top face, a bottom face, a left face, a front face, a right face, and a back face, where an image content of a north polar region of the sphere is projected onto the top face, an image content of a south polar region of the sphere is projected onto the bottom face, and an image content of an equatorial region of the sphere is projected onto the left face, the front face, the right face and the back face; and the second square projection face is one of the left face, the front face, the right face and the back face.

11. The cube-based projection method of claim 8, wherein the first mapping function set comprises:

$$g_u(u) = \frac{4}{\pi}\tan^{-1}(u) \text{ and } g_v(v) = \frac{4}{\pi}\tan^{-1}(v);$$

and
the second mapping function set comprises:

$$g_u(u) = \frac{4}{\pi}\tan^{-1}(u) \text{ and } g_v(u, v) = \begin{cases} v, \text{ if } t = 0 \\ \dfrac{1 - \sqrt{1 - 4t(v - t)}}{2t}, \text{ otherwise} \end{cases}$$

where $t = 0.4v(g_u(u)^2 - 1)$.

12. The cube-based projection method of claim 1, wherein the second mapping function set comprises different mapping functions applied to different axes, respectively.

13. The cube-based projection method of claim 12, wherein the different mapping functions comprise a first mapping function that is an equal-angular mapping function and is applied to a first axis, and further comprise a second mapping function that is not an equal-angular mapping function and is applied to a second axis which is different from the first axis.

14. The cube-based projection method of claim 1, wherein at least one of the first mapping function set and the second mapping function set is a combination of mapping function sets including one mapping function set arranged to be applied to a processing result of another mapping function set.

15. The cube-based projection method of claim 14, wherein said another mapping function set comprises an equal-angular mapping function, and said one mapping function set comprises a mapping function that is not an equal-angular mapping function.

16. A cube-based projection method comprising:
generating, by a conversion circuit, pixels of different square projection faces associated with a cube-based projection of a 360-degree image content of a sphere, comprising:
generating pixels of a first square projection face by utilizing a first mapping function set; and
generating pixels of a second square projection face by utilizing a second mapping function set, wherein the different square projection faces comprise the first square projection face and the second square projection face, and the second mapping function set is not identical to the first mapping function set;

wherein the second mapping function set comprises different mapping functions applied to a same axis, the different mapping functions comprise a first mapping function and a second mapping function, and the second square projection face has a first pixel that is set according to a first location on said same axis and the first mapping function, and has a second pixel that is set according to a second location on said same axis and the second mapping function, where the second location is different from the first location.

17. The cube-based projection method of claim 16, wherein the first mapping function is an equal-angular mapping function, and the second mapping function is not an equal-angular mapping function.

18. A cube-based projection method comprising:
generating, by a conversion circuit, pixels of different square projection faces associated with a cube-based projection of a 360-degree image content of a sphere, comprising:
generating pixels of one of the different square projection faces by utilizing a mapping function set, wherein the mapping function set comprises different mapping functions applied to a same axis, the different mapping functions comprise a first mapping function and a second mapping function, and said one of the different square projection faces has a first pixel that is set according to a first location on said same axis and the first mapping function, and has a second pixel that is set according to a second location on said same axis and the second mapping function, where the second location is different from the first location.

19. A cube-based projection method comprising:
generating, by a conversion circuit, pixels of different square projection faces associated with a cube-based projection of a 360-degree image content of a sphere, comprising:
generating pixels of a first square projection face by utilizing a first mapping function set; and
generating pixels of a second square projection face by utilizing a second mapping function set, wherein the different square projection faces comprise the first square projection face and the second square projection face;
wherein the second mapping function set comprises:

$$g_v(u, v) = \begin{cases} v, & \text{if } t = 0 \\ g'''_v(t, v), & \text{otherwise} \end{cases},$$

where $t=g'_v(u, v)$, $g'_v(u, v)$ is a function of u in a first direction and v in a second direction, and $g''_v(t, v)$ is a function of t and v.

* * * * *